Jan. 17, 1939.    H. W. PRICE ET AL    2,144,031
CLUTCH CONTROL MECHANISM
Filed Oct. 12, 1931    2 Sheets-Sheet 1

INVENTOR.
HAROLD W. PRICE
EARL R. PRICE
BY H. O. Clayton
ATTORNEY

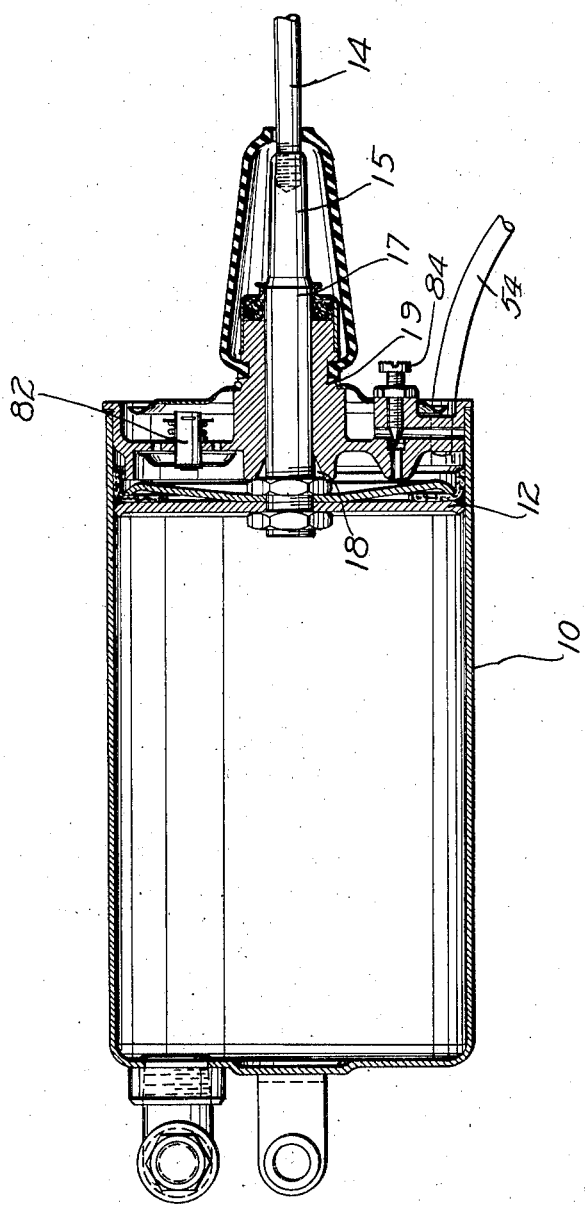

Patented Jan. 17, 1939

2,144,031

UNITED STATES PATENT OFFICE 2,144,031

CLUTCH CONTROL MECHANISM

Harold W. Price and Earl R. Price, South Bend, Ind., assignors to Bendix Aviation Corporation, South Bend, Ind., a corporation of Delaware Application October 12, 1931, Serial No. 568,402

3 Claims. (Cl. 192—.01)

This invention relates to power operated means for controlling the engagement and disengagement of an automotive clutch mechanism operable in conjunction with the automotive throttle controlling means.

It is the principal object of the invention to provide a mechanism of this character adapted to simulate the conventional synchronized manual clutch and throttle control. In such conventional control both the relative rates of throttle opening, or speeding up of the engine, and clutch release and the rate of clutch release for a given throttle opening are determined by the end desired: i. e., if the car is mired or stalled in sand, the aforementioned modes of control are different from those effected when the car is to be started on level ground or in motion during the gear shifting operations or when "free wheeling".

In one desirable construction there is provided a vacuum operated double-ended fluid motor for operating the clutch, the control valve for the motor being operated conjointly with the accelerator pedal or throttle control, means being provided for throttling or varying the rate of efflux of air from the compression side of the motor and thus control the clutch engagement, said means, in part, being operable as the throttle is opened and in timed relation therewith, and, in part, dependent upon the position of the piston of the motor.

A further object of the invention is to provide a two-part manually operable means for operating the aforementioned control valve and first mentioned throttling means.

Other objects of the invention and desirable details of construction and combinations of parts will become apparent from the following detailed description of a preferred embodiment of the invention taken in conjunction with the accompanying drawings, in which:

Figure 3 is a longitudinal sectional view through the clutch operating fluid motor unit.

Figure 1:
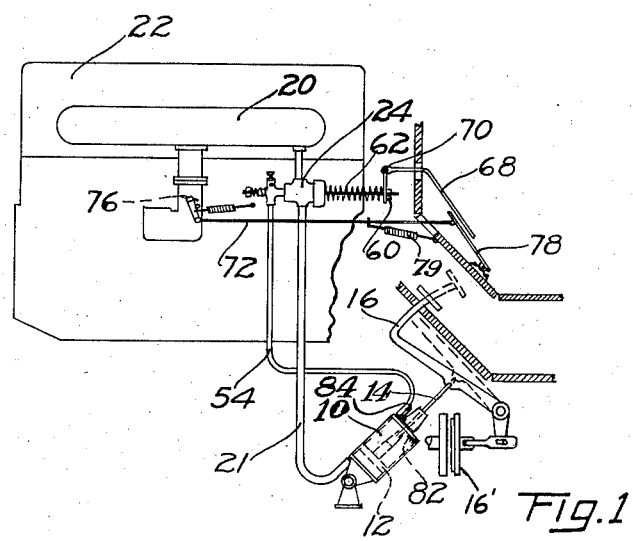
Figure 1 is a diagrammatic view of the control mechanism constituting the invention.

As disclosed in the figures of the drawings, there is provided a vacuum operated double-ended fluid motor or actuator comprising a pivotally mounted cylinder 10 and reciprocable piston 12, the latter connected by rod 14 with the conventional clutch pedal 16. The pedal operates a clutch comprising friction plate 16'. As clearly disclosed in Figure 3, and for a purpose to be set forth in detail hereinafter, the rod 14 is connected to the tapered end portion 15 of a projection 17, the latter extending from the piston 12 and being slidingly received within a hub portion 19 of the end wall of the cylinder. The hub 19 at the inner end of its bore is preferably recessed or countersunk at 18 to receive the tapered end 15 of the projection. The details of the fluid motor are not claimed herein, inasmuch as the same form the subject matter of our application No. 568,403, filed October 12, 1931.

The clutch is disengaged by evacuating the left compartment of the motor, an air transmitting conduit 21 being connected to the intake manifold 20 of an internal combustion engine 22 between the carburetor and the engine pistons. As is well-known in the art, there is an appreciable vacuum developed in the manifold at closed throttle by virtue of the pumping action of the engine pistons. The actuator control valve 24 is interposed in the conduit connection, the same forming no part of the present invention, being described, disclosed and claimed in an application of Victor W. Kliesrath, No. 568,081, filed October 10, 1931.

Briefly stated, this valve comprises a casing 26 housing a reciprocable spring pressed valve piston member 28, the latter provided with a recess 30 to either register ports 32 and 34, to evacuate the motor and disengage the clutch, Figure 1, or register port 34 and atmospheric ports 38 to vent the motor and effect an engagement of the clutch.

According to an important feature of the invention, the engagement of the clutch is, in part, timed by supplemental valve means, preferably though not necessarily mounted on the casing of the valve 24. Such means comprises a casing member 40 in screw threaded engagement with the valve 24 and bored to slidingly receive a spring pressed reciprocable valve plunger 42, the latter provided with a tapered recess 44. The casing is also provided with oppositely disposed bored projections 46 and 48, the upper projection 46 being provided with a manually adjustable set screw 50 or equivalent member, such as a needle valve member, for determining the size of an air bleed opening 52 in the wall of the projection. The lower projection 48 is connected to the right compartment end wall of the cylinder 10 by a conduit 54. The abutting valve plungers 42 and 28 are bored to receive a tension member 56, the latter having a set screw connection at 58 with the flanged end of the plunger 42 and being provided at its other end with a stop 60, the latter being normally pressed, by compressed spring 62, to the right, as shown in Figure 1. The spring 62 further serves to compress valve springs 64 and 66, moving the recess 44 out of registry with the bores of projections 46 and 48, and also registering ports 34 and 38 in valve 24 to vent the actuator. A bell crank shaped valve operating treadle member 68 is fulcrumed at 70 and is likewise pressed to its off position by spring 62. The structure is completed by the accelerator operated throttle rod 72. According to one feature of the invention the valve operating treadle 68 is superposed over the accelerator pedal 78, as disclosed in Figure 1 of the drawings, there being sufficient space between the two to permit a full opening or venting of the valve 24 before the throttle opening is initiated.

Figure 2:
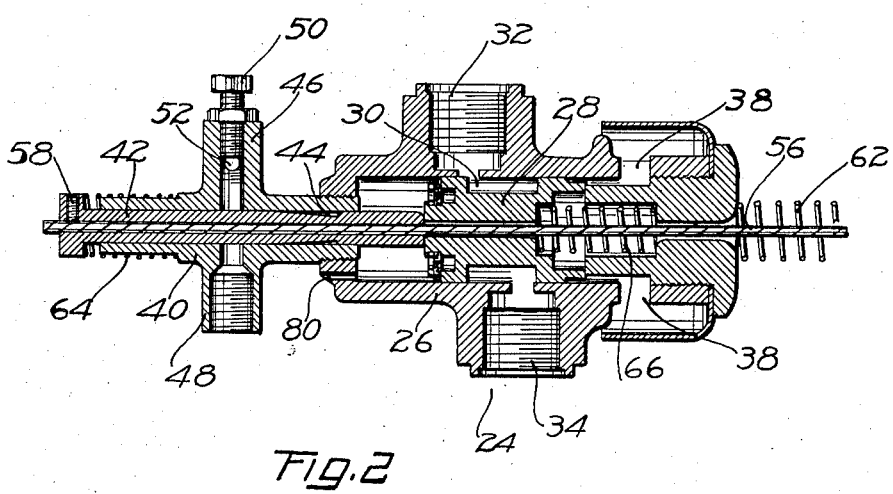
Figure 2 is a longitudinal sectional view through the control valve structure.

In Figures 1 and 2 of the drawings the parts are shown in their throttle and clutch released position, the spring 62 serving to compress spring 64 and move the recess 44 out of registry with the projections 46 and 48 and also serving to compress spring 66 to register ports 32 and 34 and evacuate the motor to disengage the clutch. The clutch is thus automatically disengaged and the throttle closed, when and if the foot is removed from the treadles 68 and 78, the valve 24 being opened after the throttle is fully closed. The accelerator 78 is returned to its off position by a return spring 79.

Upon effecting a successive depression of the treadles to close the valve and open the throttle the ports 34 and 38 are first fully registered by the expansion of spring 66, this action being followed by an opening movement of the throttle 76 by the rod 72 after the lost motion between the treadles 68 and 78 is taken up. During this operation plunger 42 in the supplementary valve mechanism moves with piston 28 under the action of its spring 64 to register the recess 44 with the bores of the projections 46 and 48 to a degree depending upon the position of the accelerator pedal 78. Preferably the valve 24 is fully vented before there results any appreciable uncovering of the recess 44.

There is thus effected a synchronized influx of air to the suction side of the piston 12 and an efflux of air from the compression side of the piston via the recess 44 and the bleed opening 52, and also via the bore in the piston hub 17. An opening 80 in the casing 40 and a check valve 82 in the cylinder 10 both serve to obviate drag of the pistons 28 and 12, respectively, during their clutch disengaging movement. An adjustable needle valve mechanism 84 may also be incorporated in the end wall of the cylinder 10 to provide a means for supplementing the bleed of air from the cylinder via the valve 24.

The relative timing of the throttle opening and clutch engagement may thus be effected, the shape of the recess 44, the adjustment of the needle valve 50, the lost motion between the treadles, the length of the rods 56 and 72, strength of the several springs, degree of vacuum, size and position of the valve ports with respect to the movable valve members and the motor piston and cylinder hub construction, all constituting, among many other variables, means for varying this relative clutch and throttle timing.

It will be apparent that the rate at which the throttle is opened will materially affect the relative operations of the throttle and clutch, for as the plunger 42 is moved to the left, increasing the depth of the taper of recess 44, the rate of efflux of air from the cylinder 10, via the bleed valve 50, will be increased, there resulting a change of velocity of the moving clutch pedal in its engaging movement.

A predetermined mode of movement of the clutch pedal is effected with a given rate of influx and efflux of air into and from the motor, this by virtue of the variable action of the piston within the cylinder of the fluid motor, due to static friction, momentary compression of air and other variables. These factors, however, are inherent in any given structure. With the suggested construction, however, this movement whether it be an accelerated or uniform one is progressively varied as the throttle is opened.

Assuming a fixed position of the throttle rod, there results a definite bleed of the air at 52. This predetermined rate of efflux is of particular importance in maintaining a definite mode of clutch plate movement, or in other words increase of clutch spring load, when the plates are in slipping engagement. Prior to such engagement the clutch take up movement is quite rapid by virtue of the large vent via the bore in the hub 19. After the tapered projection 15 enters the bore, however, the rate of efflux of air is progressively decreased, the final increment of clutch contacting plate movement being controlled, at the will of the driver, by the degree of throttle opening which controls the setting of the valve plunger 42.

The relative time of initiation of throttle opening and clutch movement, the relative rates of throttle opening and clutch movement once initiated and the rate of clutch plate movement for a given throttle setting may thus be determined by the aforementioned variables. The clutch may thus be engaged quickly or slowly and in timed relation to the opening of the throttle, depending upon the mode of operation of the control treadles. For example, in starting the vehicle with the transmission in low or first gear the usual practice in manually controlling the clutch engagement and throttle opening is to slowly open the throttle and just as slowly release the clutch pedal. This mode of operation gives a smooth start and obviates a grabbing clutch. With the clutch operating power mechanism suggested by this invention such a manual control is accurately simulated, for with a minimum throttle opening there results a correspondingly slow bleed, via the small end of the taper 44 in the bleed valve plunger 42. When a quick start is desired, as in traffic or when free wheeling, it is the usual practice in conventional driving to rapidly engage the clutch and open the throttle; here again the suggested mechanism accurately reproduces such a control, for with an appreciable depression of the throttle the rate of bleed, and hence the rate of clutch engagement, is correspondingly increased by virtue of the greater depth of taper at 44 exposed to the bores 46 and 48 in the bleed valve structure.

While one illustrative embodiment has been described, it is not our intention to limit the scope of the invention to that particular embodiment, or otherwise than by the terms of the appended claims.

We claim:

1. In a vacuum operated power means for operating an automotive clutch, the combination with an internal combustion engine and a clutch of a throttle for controlling the operation of the engine, a double-ended vacuum operated motor operably connected with the clutch, manually operable means for operating said throttle and controlling the operation of said power means, valve means for controlling the clutch engaging operation of said motor by controlling the gaseous pressure of one end of said double-ended motor, and other valve means for controlling the gaseous pressure of the other end of the motor, adjustable yieldable means for operating said valve means to control the engagement of the clutch, both of said valve means being controlled by said aforementioned manually operated means in sequential relation therewith.

2. In a vacuum operated power means for operating an automotive clutch, the combination with an internal combustion engine and a clutch of a throttle for controlling the operation of the engine, manually operable means for operating said throttle, a pressure differential operated motor operably connected with the clutch, valve means for controlling the clutch engaging operation of said motor by controlling the gaseous pressure therein during the engagement of the clutch, and other valve means for controlling the gaseous pressure of the motor to initiate the clutch disengaging and engaging operations thereof, adjustable means for operating said separate valve means and other adjustable means interconnecting both of said valve means and said manually operable means, both of said valve means being operable by said aforementioned manually operated throttle operating means in timed relation therewith and in timed relation with each other.

3. In a vacuum operated power means for operating an automotive clutch, the combination with an internal combustion engine and a clutch of a throttle for controlling the operation of the engine, manually operable means for operating said throttle, a double-ended vacuum operated motor operably connected with the clutch, valve means for controlling the clutch engaging operation of said motor by controlling the gaseous pressure on one end of said motor, other valve means for controlling the gaseous pressure of the other end of the motor, adjustable yieldable means for operating said separate valve means, and other adjustable yieldable means interconnecting both of said valve means and said manually operated means, both of said valve means being operable by said aforementioned manually operated throttle operating means in timed relation therewith and with each other.

HAROLD W. PRICE.
EARL R. PRICE.